United States Patent
Willis et al.

(10) Patent No.: US 6,217,798 B1
(45) Date of Patent: Apr. 17, 2001

(54) METHOD FOR SYNTHESIS OF A DILITHIUM DIISOPROPENYLBENZENE-BASED DIINITIATOR

(75) Inventors: Carl Lesley Willis, Houston; Grant Wesley Haddix, Katy, both of TX (US); David Karl Schisla; Fred Hendrik van der Steen, both of Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/409,924

(22) Filed: Sep. 30, 1999

Related U.S. Application Data

(60) Provisional application No. 60/103,695, filed on Oct. 9, 1998.

(51) Int. Cl.$^7$ .................................................. C07F 1/02
(52) U.S. Cl. ......................................................... 260/665 R
(58) Field of Search ........................................ 260/665 R

(56) References Cited

U.S. PATENT DOCUMENTS

| | | | |
|---|---|---|---|
| 3,734,973 | 5/1973 | Farrar | 260/665 R |
| 5,393,843 | * 2/1995 | Handlin, Jr. et al. | 525/332.8 |

OTHER PUBLICATIONS

"A New Difunctional Anionic Initiator Soluble in Non–polar Solvents," by Turgut Nugay & Savas Kücükyavuz, *Polymer International* 29 (1992) pp. 195–199.

"Difunctional Initiators Based on 1–3–Diisopropenylbenzene. 3. Synthesis of a Pure Dilithium Adduct and Its Use as Difunctional Anionic Polymerization Initiator," by Y. S. Yu, Ph. Dubois, R. Jérôme, and Ph. Teyssié, *Macromolecules* 1996, 29, pp. 2738–2745.

"Core–First Synthesis of Star Polymers With Potentially Ionogenic Branches," by C. Tsitsilianis, P. Lutz, S. Graff, J. Lamps, and P. Rempp, *Macromolecules*, vol. 24, No. 22, Oct. 28, 1991, pp. 5897–5902.

"Macromolecular Colloquium," by Ackermann, D. Bode, M. Grubert, and U. Schemau, *Angewandte Chemie Conference Reports*, Jun. 1974, pp. 412–413.

"Preparation and Some Properties of Star-Shaped Polymer With More Than Hundred Side Chains," by Helmut Eschwey, Manfred L. Hallensleben, and Walther Burchard, *Die Makromolekulare Chemie*, 173, (1973) pp. 235–239.

"The Reaction of Isopropyllithium and t–Butyllithium With Simple Olefins," by P. D. Barlett, S. Friedman, and M. Stiles, *JACS* [*Journal of the American Chemical Society*], vol. 75, (1953) pp. 1771–1772.

"Conditions and Limits of the Reaction," by Paul D. Bartlett, Stephen J. Tauber, and William P. Weber, *The Ethylenation of Secondary and Tertiary Alkyllithiums*, vol. 91, (1969) pp. 6362–6366.

"Polymers from Diisopropenylbenzene," by Howard A. Colvin and Joel Muse, *Chemtech*, vol. 15(8), (1986), pp. 500–504.

"Addition of sec–Butyllithium to m–Diisopropenylbenzene," by G. Gordon Cameron and Gavin M. Buchan, *Polymer* 1979, vol. 20, pp. 1129–1132.

"An Efficient Bifunctional Lithium–Organic Initiator to be Used in Apolar Solvent," by Pierre Lutz, Emile Franta and Paul Rempp, *Polymer*, 1982, vol. 23, pp. 1953–1959.

"Efficiency of the sec–Butyllithium/m–Diisopropenylbenzene Diadduct as an Anioic Polymerization Initiator in Apolar Solvent," by Y.S. Yu, R. Jérôme, R. Fayt, and Ph. Teyssié, *Macromolecules*, 1994, 27, pp. 5957–5963.

"Difunctional Initiator Based on 1–3–Diisopropenylbenzene. 2. Kinetics and Mechanism of the sec–Butyllithium/1,3–Diisopropenylbenzene Reaction," by Y. S. Yu, Ph. Dubois, R. Jérôme, and Ph. Teyssié, *Macromolecules*, 1996, 29, pp. 1753–1761.

* cited by examiner

*Primary Examiner*—Porfirio Nazario-Gonzalez
(74) *Attorney, Agent, or Firm*—Donald F. Haas

(57) ABSTRACT

This invention is a process for making a difunctional lithium initiator which comprises reacting a secondary or tertiary lithium alkyl with a diisopropenylbenzene compound in the presence of diethyl ether at a temperature of 25 to 50° C. wherein the molar ratio of the diethyl ether to the lithium alkyl is from above 0.1:1 to 2:1 and the diisopropenylbenzene compound and the diethyl ether are first mixed together and then added to the lithium alkyl. The molar ratio of the diisopropenylbenzene compound to the lithium alkyl should be as close to 0.5:1 as possible. An excess of lithium alkyl may be used if a product containing both diinitiator and monoinitiator is preferred. It is preferred that the molar ratio of diethyl ether to lithium alkyl be as close to 1:1 as possible.

15 Claims, No Drawings

METHOD FOR SYNTHESIS OF A DILITHIUM DIISOPROPENYLBENZENE-BASED DIINITIATOR

This application claims the benefit of U.S. Provisional Application No. 60/103,695, filed Oct. 9, 1998, the entire disclosure of which is hereby incorporated by reference

FIELD OF THE INVENTION

This invention relates to a process for making anionic polymers using dilithium initiators. More particularly, this invention relates to a method for making a dilithium diisopropenylbenzene-based initiator for use in such a process.

BACKGROUND OF THE INVENTION

Functionalized anionically polymerized polymers of conjugated dienes and other monomers wherein the functionalization is terminal and/or internal are known. Particularly, U.S. Pat. No. 5,393,843 describes poly-butadiene polymers having terminal functional groups. One of the methods described for making such polymers involves anionic polymerization utilizing a dilithium initiator such as the adduct derived from the reaction of m-diisopropenylbenzene with two equivalents of s-BuLi. Monomer is added to the initiator in hydrocarbon solution and anionic living polymer chains grow outwardly from the ends of the dilithium initiator.

U.S. Pat. No. 3,734,973 describes the production of multifunctional anionic polymerization initiators by reacting diisopropenylbenzene compounds with organo monolithium compounds. These two components are reacted in a molar range of 0.1:1 to 4:1 and the reaction is conducted in the presence of a polymerizable monovinyl-substituted aromatic compound employed as a solubilizing monomer and also in the presence of a hydrocarbon or polar diluent. For example, it describes the addition of butadiene to a mixture of diisopropenylbenzene and toluene and then adding secondary butyllithium to that mixture in solution in cyclohexane, after which time the reaction to form the dilithium initiator was carried out. The reaction was also carried out without the butadiene as a solubilizing agent and a precipitate formed. These initiators were used to carry out the anionic copolymerization of stryene and butadiene. They can also be used to make block copolymers of those monomers.

Unfortunately, the chemistry involved in the reaction of the diisopropenylbenzene and the lithium alkyl is prone to suffer from a competing side reaction which forms oligomers of diisopropenylbenzene. The oligomers consume diisopropenylbenzene and this limits the yield of the dilithium initiator. In addition and perhaps more importantly, the oligomers have more than two lithium centers per molecule. If all of the lithium centers in the oligomers initiate polymerization, a nonlinear, star, or radial polymer will result. This is undesirable if the desired polymer is a difunctional anionic polymer.

For these reasons, it can be seen that it is desirable to limit the level of oligomerization in the synthesis of the dilithium initiator from diisopropenylbenzene. We have discovered that combining the components in a particular order, carrying out the reaction within a narrow temperature range, and carrying out the reaction in the presence of the appropriate amount of diethyl ether provides the advantage of minimizing the oligomerization of the diisopropenyl-benzene.

SUMMARY OF THE INVENTION

This invention is a process for making a difunctional lithium initiator which comprises reacting a secondary or tertiary lithium alkyl with a diisopropenylbenzene compound in the presence of diethyl ether at a temperature of 25 to 50° C. wherein the molar ratio of the diethyl ether to the lithium alkyl is from above 0.1:1 to 2:1 and the diisopropenylbenzene compound and the diethyl ether are first mixed together and then added to the lithium alkyl. The molar ratio of the diisopropenylbenzene compound to the lithium alkyl should be as close to 0.5:1 as possible. Clearly, having an excess of diisopropenylbenzene compound is undesirable as it will promote the formation of oligomers. If there is not enough lithium alkyl to react with all of the isopropenyl centers, they will react with the newly formed benzyl lithium centers and in this way make oligomers. Having excess lithium alkyl, on the other hand, is only undesirable if the polymerization application cannot tolerate monoinitiated product. Monoinitiated product would arise from the excess lithium alkyl used in the preparation of the diinitiator. For some applications, a combination of monoinitiated and diinitated polymers will be preferred. For these applications, an excess of lithium alkyl should be used in the preparation of the diinitiator. It is preferred that the molar ratio of diethyl ether to lithium alkyl be as close to 1:1 as possible.

DETAILED DESCRIPTION OF THE INVENTION

The diisopropenylbenzene compounds which can be used according to the present invention are represented by the following formula

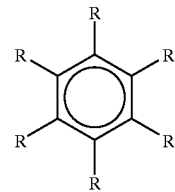

where two R's are isopropenyl radicals and each of the remaining R's is hydrogen, or an alkyl, or cycloalkyl radical, or combinations thereof, containing from one to six carbon atoms.

Exemplary compounds are 1,2-diisopropenylbenzene; 1,3-diisopropenylbenzene; 1,4-diisopropenylbenzene; 3,4,5,6-tetramethyl-1,2-diisopropenylbenzene; 2,4,5,6-tetraethyl-1,3-diisopropenyl-benzene; 2,3,5,6-tetra-n-hexyl-1,4-diisopropenylbenzene; 3,4-dicyclohexyl-1,2-diisopropenylbenzene; 5-(3-methyl-cyclopentyl)-1,3-diisopropenylbenzene; 3-cyclopentyl-methyl-6-n-propyl-1,4-diisopropenylbenzene; 4-(2-cyclo-butyl-1-ethyl)-1,2-diisopropenylbenzene; 3-(2-n-propylcyclopropyl)-1,4-diisopropenylbenzene; 2-methyl-5-n-hexyl-1,3-diisopropenylbenzene; 4-methyl-1,2-diisopropenylbenzene; 5-ethyl-1,3-diisopropenylbenzene; 3-methyl-1,4-diisopropenylbenzene; and the like. 1,3-diisopropenylbenzene is preferred. The meta isomer gives the best product because it gives a faster rate of reaction with the lithium alkyl.

The organomonolithium compounds that are reacted with the diisopropenylbenzene compounds of this invention are represented by the formula R'Li, wherein R' is a secondary or tertiary alkyl, preferably containing from 3 to 20, preferably 4 to 10, carbon atoms per molecule. Exemplary of these organomonolithium compounds are isopropyllithium, sec-butyllithium, tert-octyllithium, tert-butyllithium, and the like. sec-butyl and tert-butyllithium are preferred.

The dilithium initiators of this invention are prepared by reacting a lithium alkyl compound with a diisopropenylbenzene compound at a mole ratio of diisopropenylbenzene to lithium alkyl in the range of 0.4:1 to 0.6:1, preferably 0.45:1 to 0.55:1. Excess lithium alkyl may be used for applications where a mixture of diinitiator and monoinitiator is preferred. Diethyl ether is utilized in the reaction at a molar ratio of diethyl ether to lithium alkyl compound of above 0.1:1 to 1.5:1 for secondary lithium alkyls and 2:1 for tertiary lithium alkyls, preferably 0.4:1 to 1.1:1, and most preferably about 1:1 for secondary lithium alkyls and 2:1 for tertiary lithium alkyls because this ratio gives the best results with poorer results observed at both lower and higher ratios.

This reaction is carried out in a relatively narrow temperature range of 25 to 50° C. and in the case of secondary lithium alkyls, 40 to 50° C. Lower yields of the dilithium initiator and thus higher levels of oligomer will be obtained at higher and lower temperatures. If a dilithium initiator is prepared according to this invention at a lower temperature, heating it to a temperature within the above range will result in increased levels of the dilithium initiator.

The order of addition of the components of this reaction is very important to achieving the desired result of the minimization of the oligomers produced and the maximization of the production of the dilithium initiator. In order to accomplish this result, the diisopropenylbenzene compound and the diethyl ether are first mixed together. Then they are added to the lithium alkyl compound. It is highly preferred that this mixture be added to the lithium alkyl at a rate that allows control of the reaction temperature within the desired range.

Anionically polymerized polymers of conjugated dienes and/or vinyl aromatic hydrocarbons and/or other monomers can be made with the dilithium initiators according to conventional practice such as described in U.S. Pat. No. 3,734,973. Functionalized anionic polymers wherein the functionalization is terminal and/or internal are produced using the dilithium initiators of the present invention, such as described in U.S. Pat. No. 5,393,843. The polymer is made by anionic polymerization utilizing a dilithium initiator which is the adduct derived from the reaction of m-diisopropenylbenzene with two equivalents of s-BuLi.

Monomer is added to the initiator in hydrocarbon solution and anionic living polymer chains grow outwardly from the ends of the dilithium initiator. The polymers to be functionalized are then capped to form functional end groups as described in U.S. Pat. Nos. 4,417,029, 4,518,753, and 4,753,991. Of particular interest herein are terminal hydroxyl, carboxyl, sulfonate, and amine groups. To make unfunctionalized polymers, the living chain ends are terminated with hydrogen or methanol.

EXAMPLES

Example 1

The general procedure used herein for making diisopropenylbenzene/alkyllithium diinitiators is as follows:

An appropriate amount of polymerization grade cyclohexane was charged to a 1-gallon stainless steel autoclave at room temperature. An alkyllithium solution was then charged to the autoclave. Alkyllithium initiator compounds included sec-butyllithium, (sBLi), phenyllithium (PLi), 2-ethylhexyllithium (EHLi), n-butyllithium (nBLi), n-heptyllithium (nHLi), and tert-butyllithium (tBLi). We then added to the autoclave, incrementally, a mixture of diethyl ether (DEE) (or other modifier such as methyl t-butyl ether (mtBE) or diethoxypropane (DEP), or o-dimethoxybenzene (ODMB)), cyclohexane, and m-diisopropenylbenzene, over a period of several minutes. The mixture was added over a long enough period of time to insure the ability to control the temperature rise produced. After all of the mixture was added, the desired temperature was held constant until the total reaction time was one or more hours. A typical reaction time was one hour including the addition time for diisopropenylbenzene.

The ingredients, conditions, ratios, and results are given in Table 1 below. The amount of desired diisopropenylbenzene (DIPB) and the amounts of the undesirable oligomers were determined by GPC analysis and are given on a weight percent basis. 1 is the desired compound. 2 is dimer, 3 is trimer, 4 is tetramer, and 5+ is the larger species.

Comparative examples are identified by "c" after the example number.

TABLE 1

| Example | Expt. No. | Temp. (° C.) | Time (hrs) | Initiator Type | Initiator Amount (g) | Promoter Type | Promoter Amount (g) | Promoter: Initiator Molar Ratio | DIPB (g) | DIPB: Initiator Molar Ratio | Oligomers by GPC (wt %) 1 | 2 | 3 | 4 | 5+ |
|---|---|---|---|---|---|---|---|---|---|---|---|---|---|---|---|
| 1c | 23256-145 | 25–30 | 1 | sBLi | 31.8 | DEE | 78 | 2:1 | 39.56 | 0.61 | 45 | 23 | 16 | 8 | 5 |
| 2c | 149 | 25 | 1 | sBLi | 32 | DEE | 78 | 1:1 | 39.56 | 0.71 | 42 | 22 | 15 | 9 | 10 |
| 3c | 151 | 25 | 1 | sBLi | 32 | None | None | NA | 39.56 | 0.70 | 17 | 23 | 15 | 12 | 35 |
| 4c | 153 | 25 | 1 | sBLi | 31.9 | DEE | 37.1 | 1:1 | 39.56 | 0.56 | 66 | 20 | 9 | 2 | 1 |
| 5c | 159 | 25 | 0.67 | sBLi | 32.0 | DEP | 3.6 | 0.054:1 | 39.56 | 0.67 | 50 | 19 | 9 | 5 | 3 |
| 6[1]c | 163 | 50 | 2.8 | sBLi | 31.9 | DEE | 78 | 2:1 | 39.56 | 0.55 | 74 | 8 | 10 | — | — |
| 7 | 167 | 30 | 1 | tBLi | 31.3 | DEE | 78 | 2:1 | 39.56 | 0.52 | 90 | 6 | 2 | 1 | 1 |
| 8c | 169 | 60 | 0.5 | sBLi | 35.2 | DEE | 78 | 2:1 | 39.56 | 0.56 | 67 | 13 | 11 | 8 | 1 |
| 9c | 171 | 70 | 0.5 | sBLi | 35.2 | DEE | 78 | 2:1 | 39.56 | 0.6 | 52 | 6 | 16 | 25 | 1 |
| 10 | 175 | 50 | 1 | sBLi | 35.2 | DEE | 37.1 | 1:1 | 39.56 | 0.51 | 94 | 5.3 | 0.9 | 0.2 | 0 |
| 11c | 177 | 40 | 1 | sBLi | 35.2 | DEE | 78 | 2:1 | 39.56 | 0.53 | 79 | 13 | 6 | 2 | 0 |
| 12c | 181 | 50 | 2 | sBLi | 35.2 | MTBE | 48.5 | 1:1 | 39.56 | 0.56 | 65.3 | 20.3 | 14 | 0 | 0 |
| 13c | 183 | 50 | 2 | sBLi | 8.8 | DEE | 36.7 | 3.6:1 | 39.56 | 0.77 | 7.6 | 5.9 | 12.8 | 17.4 | 56 |
| 14c | 185 | 50 | 2 | sBLi | 8.8 | DEE | 36.7 | 3.6:1 | 39.56 | 0.45 | 56.7 | 2.7 | 12.2 | 14.1 | 14.2 |
| 15 | 187 | 50 | 2 | sBLi | 36.3 | DEE | 18.7 | 0.45:1 | 39.56 | 0.51 | 92.1 | 6.5 | 0.9 | 0.6 | 0 |
| 16c | 189 | 50 | 2 | nbLi | 35.2 | DEE | 36.7 | 1:1 | 39.56 | 0.81 | 0 | 4.8 | 6.8 | 8.1 | 80.2 |
| 17 | 193 | 50 | 2 | sBLi | 8.8 | DEE | 10.2 | 1:1 | 39.56 | 0.45 | 93 | 7 | 0 | 0 | 0 |
| 18c | 195 | 50 | 2 | sBLi | 35.2 | DEP | 7.2 | 0.1:1 | 39.56 | 0.54 | 74.9 | 12.9 | 6.8 | 5.4 | 0 |

TABLE 1-continued

| Example | Expt. No. | Temp. (° C.) | Time (hrs) | Initiator Type | Initiator Amount (g) | Promoter Type | Promoter Amount (g) | Promoter: Initiator Molar Ratio | DIPB (g) | DIPB: Initiator Molar Ratio | Oligomers by GPC (wt %) 1 | 2 | 3 | 4 | 5+ |
|---|---|---|---|---|---|---|---|---|---|---|---|---|---|---|---|
| 19c | 197 | 50 | 2 | pLi | 51 | DEE | 75.9 | 1.7:1 | 39.56 | 0.40 | 47.1 | 25 | 27.9 | 0 | 0 |
| 20 | 199 | 50 | 2 | sBLi | 64.4 | DEE | 73.3 | 1:1 | 39.56 | 0.52 | 87.2 | 8.9 | 3.8 | 0 | 0 |
| 21c | 23749-5 | 50 | 2 | nhLi | 37.1 | DEE | 6.73 | 1:1 | 6.58 | 0.79 | 0.9 | 13.6 | 9.9 | 26.1 | 49.4 |
| 22 | 7 | 30 | 2 | tBLi | 35.1 | DEE | 40.8 | 1:1 | 43.27 | 0.51 | 97.2 | 0.9 | 1.9 | 0 | 0 |
| 23 | 9 | 50 | 2 | tBLi | 33.3 | DEE | 40.7 | 1:1 | 39.56 | 0.50 | 98.2 | 1.9 | 0 | 0 | 0 |
| 24c | 11 | 30 | 2 | sBLi | 38.2 | DEE | 39.4 | 1:1 | 39.6 | 0.53 | 81.5 | 15.4 | 2.7 | 0.4 | 0 |
| 24A[2] | 11 | 50 | 4 | sBLi | 38.2 | DEE | 39.4 | 1:1 | 39.6 | 0.51 | 90.5 | 7.9 | 1.6 | 0 | 0 |
| 25[6]c | 13 | 30 | 2 | sBLi | 32.8 | DEE | 39.8 | 1:1 | 39.56 | 0.52 | 85.6 | 12.2 | 2.1 | 0 | 0 |
| 26[3]c | 15 | 50 | 2 | sBLi | 32.8 | DEE | 37.9 | 1:1 | 39.56 | 0.59 | 51 | 20.9 | 11.4 | 7.2 | 9.4 |
| 27[4] | 17 | 50 | 2 | sBLi | 2.3 | DEE | 2.2 | 1:1 | 4.59 | 0.79 | 9.6 | 12.8 | 16.5 | 16.3 | 38.8 |
| 28c | 19 | 50 | 2 | tBLi | 34.0 | None | None | NA | 39.56 | 0.61 | 53.9 | 6 | 8.2 | 12.6 | 18.2 |
| 29c | 21 | 50 | 2 | sBLi | 32.7 | DEP | 67.7 | 1:1 | 39.56 | 0.70 | 15.4 | 21.1 | 27.9 | 14.3 | 19.3 |
| 30c | 23 | 50 | 2 | ehLi | 61.5 | DEE | 39 | 1:1 | 39.56 | 0.81 | 1.4 | 5.2 | 9.5 | 9.9 | 73.6 |
| 31c | 25 | 50 | 2 | sBLi | 32.7 | ODMB | 71 | 1:1 | 39.54 | 0.56 | 70.6 | 15 | 2.8 | 0.5 | 0.2 |
| 32 | 27 | 50 | 2 | sBLi | 33.3 | DEE | 38 | 1:1 | 39.56 | 0.52 | 89.6 | 8.1 | 2.3 | 0 | 0 |
| 33 | 29 | 30 | 0.5 | tBLi | 37.5 | DEE | 42 | 1:1 | 43.8 | 0.50 | 98.7 | 1.3 | 0 | 0 | 0 |
| 34c | 31 | 30 | 2 | sBLi | 32.7 | DEP | 67.7 | 1:1 | 39.56 | 0.71 | 12.3 | 13.5 | 43 | 30.2 | — |
| 35[8] | 33 | 50 | 1 | sBLi | 72.6 | DEE | 85.45 | 1:1 | 87.55 | 0.51 | 91.1 | 7.19 | 1 | 0.22 | 0.19 |
| 36 | 35 | 50 | 1 | sBLi | 72.6 | DEE | 84.53 | 1:1 | 87 | 0.51 | 92 | 6.7 | 1.3 | 0 | 0 |
| 37 | 37 | 30 | 0.5 | tBLi | 75.2 | DEE | 86 | 1:1 | 87.6 | 0.50 | 98.6 | 1.4 | 0 | 0 | 0 |
| 38 | 39 | 30 | 0.5 | tBLi | 63.5 | DEE | 71 | 1:1 | 74.1 | 0.50 | 98.5 | 1.5 | 0 | 0 | 0 |
| 39[5]c | 41 | 30 | 0.5 | sBLi/tBLi | 16/16.6 | DEE | 37.3 | 1:1 | 37.96 | 0.53 | 82.5 | 11.5 | 6 | 0 | 0 |
| 40 | 47 | 30 | 0.5 | tBLi | 63.5 | DEE | 71.45 | 1:1 | 74 | 0.51 | 94.7 | 3.5 | 1.2 | 0 | 0 |
| 41 | 51 | 30 | 0.5 | tBLi | 63.5 | DEE | 74 | 1:1 | 74 | 0.51 | 96.9 | 1.8 | 1.2 | 0 | 0 |
| 42[7]c | 67 | 30 | 0.5 | sBLi | 125.9 | DEE | 147.3 | 1:1 | 151.9 | 0.56 | 65 | 20.3 | 11.5 | 2.1 | 1 |

[1]½ of DIPB/DEE mixture added at beginning, a sample was taken, and the rest of the mixture was added.
[2]In 24A, the reaction mixture of 24 was reacted for 2 additional hours at the higher temperature.
[3]Sample sat at room temperature for 7 days. The reagents were added in inverse order: DIPB, cyclohexane, and diethyl ether were combined in an autoclave. sBLI was added in aliquots.
[4]Made at very low concentrations of reactants in cyclohexane. Impurities may have thrown off the ratio of sBLi to DIPB.
[5]Temperature may have been too low for the amount of sBLI present.
[6]Diethyl ether added to sBLi and then DIPB added in aliquots.
[7]Used very large amount of sBLi.
[8]Reagents combined at room temperature and then heated at 50° C. for 1 hour.

It can be seen that of the modifiers used, only diethylether has the ability to achieve 80 or 90% production of the desired species. None of the other modifiers (Examples 5, 12, 18, 29, 31, and 34) produced more than 75%. It is clear from Examples 3 and 28 that poor results are achieved without DEE. Secondary and tertiary lithium alkyls are necessary. Very poor results were achieved with the primary alkyls (Examples 16, 19, 21, and 30). Temperatures above 50° C. produced poor results (Examples 8 and 9). For s-butyl lithium, temperatures of 40 to 50° C. are required to achieve good results (compare Examples 10, 15, 17, 20, 24A, 32, 35, and 36 with Examples 1 to 4, 24, and 25). t-butyllithium works well at lower temperatures (see Examples 7, 22, 33, 37, 38, 40, and 41) and at higher temperatures (Example 23). s-butyllithium does not work well at promoter:initiator ratios below 0.1:1 and above 1.5:1 (see Examples 6, 11, 13, 14, and 18) while t-butyllithium works well at ratios as high as 2:1 (see Example 7).

As discussed in footnote 3, the order of addition was reversed for comparative Example 26. This leads to higher levels of oligomerization as evidenced by the yield of 1 (Table 1) being only 51% whereas the analagous invention Example 10 gave a yield of 94% for 1 because it used the order of addition of this invention (started with sBLi in the autoclave and aliquots of a solution of DIPB, cyclohexane, and diethyl ether were added to it).

Example 2 (Comparative)

The procedure of Y. S. Yu, et al., *Macromolecules*, 1996, 29, 2735–2745, was followed in this preparation with two modifications. Diethylether was used as the promoter in the place of triethylamine and the synthesis was conducted at 50° C. instead of at −20° C. In all other regards, the synthesis was as reported in the article by Yu, et al.

The lithium alkyl reagent, t-BuLi (191.4 g of a 1.7 M solution in pentane, 0.5 mol) was combined in an autoclave with the promoter, diethylether (38.2 g, 0.5 mol). The molar ratio of promoter to lithium alkyl was 1:1. This solution was heated to 50° C. A solution of 39.56 g of diisopropenylbenzene (0.25 mol) in 511 g of polymerization grade cyclohexane was added to the reactor over a period of about 1 hour. The temperature was controlled at 50° C. The solution was maintained at 50° C. for an additional 1 hour post reaction period. An aliquot of the product was quenched with an excess of water and analyzed for the diaddition product of t-BuLi with DIPB. Analysis using a GPC method found mostly higher oligomers of DIPB, less than 5% of the desired diadduct was found.

When the procedure of Yu, et al., was followed at elevated temperatures with diethylether as the promoter, inferior yields of the diinitiator were obtained. Better yields would have been obtained if the reagents had been combined in the order described in this invention and if s-BuLi would have been used as the lithium alkyl reagent.

We claim:
1. A process for making a difunctional lithium initiator, comprising:
   mixing together a diisopropenylbenzene compound and diethylether to form a mixture; and then reacting the mixture in the presence of a secondary lithium alkyl at a temperature of from 40 to 50° C. such that the molar ratio of diethylether to lithium alkyl prior to reaction is from about 0.1:1 to 1.5:1 and the molar ratio of diisopropenylbenzene compound to lithium alkyl prior to reaction is from 0.4:1 to 0.6:1.

2. The process of claim 1 wherein the lithium alkyl is sec-butyllithium.

3. The process of claim 1 wherein the molar ratio of diethylether to lithium alkyl is from 0.4:1 to 1.1:1.

4. The process of claim 1 wherein the molar ratio of diisopropenylbenzene compound to lithium alkyl is from 0.45:1 to 0.55:1.

5. The process of claim 1 wherein the diisopropenylbenzene compound is 1,3-diisopropenyl-benzene.

6. A process for making a difunctional lithium initiator, comprising
mixing together a diisopropenylbenzene compound and diethylether to form a mixture; and then
reacting the mixture in the presence of a tertiary lithium alkyl at a temperature of from 25 to 50° C. such that the molar ratio of diethylether to lithium alkyl prior to reaction is from about 0.1:1 to 2:1 and the molar ratio of diisopropenylbenzene compound to lithium alkyl prior to reaction is from 0.4:1 to 0.6:1.

7. The process of claim 6 wherein the lithium alkyl is tert-butyllithium.

8. The process of claim 6 wherein the molar ratio of diethylether to lithium alkyl is from 0.4:1 to 1.1:1.

9. The process of claim 4 wherein the molar ratio of diisopropenylbenzene compound to lithium alkyl is from 0.45:1 to 0.55:1.

10. The process of claim 5 wherein the diisopropenylbenzene compound is 1,3-diisopropenylbenzene.

11. A process for making a difunctional lithium initiator, comprising:
mixing together a diisopropenylbenzene compound and diethylether to form a mixture; and then
reacting the mixture in the presence of a secondary or tertiary lithium alkyl at a temperature of from 25 to 50° C. such that the molar ratio of diethylether to lithium alkyl prior to reaction is from about 0.1:1 to 1.5:1 and the molar ratio of diisopropenylbenzene compound to lithium alkyl prior to reaction is less than 0.6:1.

12. The process of claim 11 wherein the lithium alkyl is sec-butyllithium or tert-butyllithium.

13. The process of claim 11 wherein the molar ratio of diethylether to lithium alkyl is from 0.4:1 to 1.1:1.

14. The process of claim 11 wherein the molar ratio of diisopropenylbenzene compound to lithium alkyl is from 0.4:1 to 0.6:1.

15. The process of claim 11 wherein the diisopropenylbenzene compound is 1,3-diisopropenyl-benzene.

* * * * *